Sept. 28, 1965 A. CUTAIA 3,209,347

GRAY CODE GENERATOR

Filed Sept. 20, 1962 2 Sheets-Sheet 1

INVENTOR

ALFRED CUTAIA

BY Donald F Voss

ATTORNEY

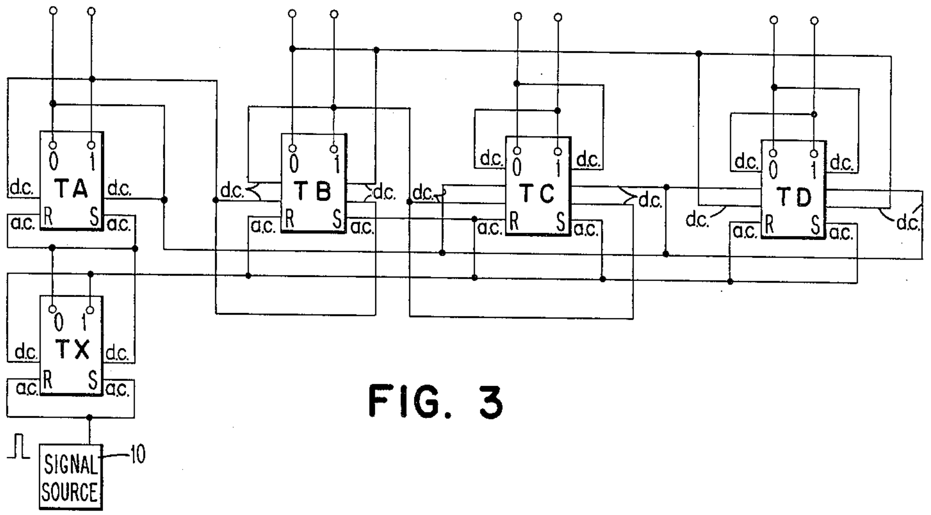
FIG. 3
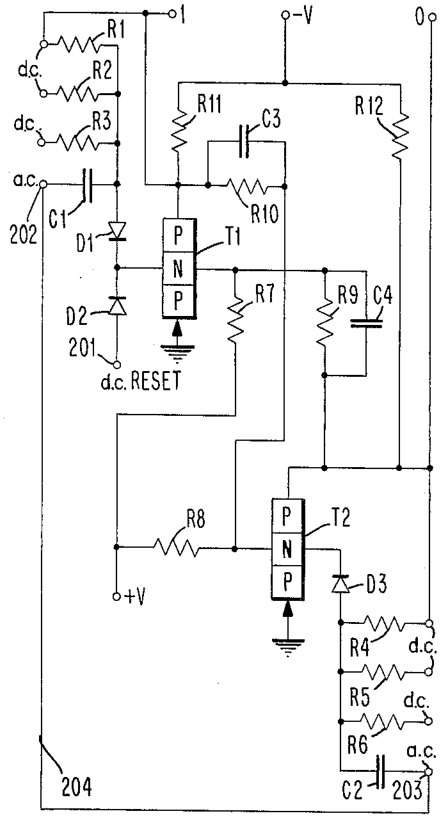
FIG. 4
| | SEQ. CTL. | CODE VARIABLES | | | |
|---|---|---|---|---|---|
| POS | TX | TA | TB | TC | TD |
| 0 | 1 | 0 | 0 | 0 | 0 |
| 1 | 0 | 1 | 0 | 0 | 0 |
| 2 | 1 | 1 | 1 | 0 | 0 |
| 3 | 0 | 0 | 1 | 0 | 0 |
| 4 | 1 | 0 | 1 | 1 | 0 |
| 5 | 0 | 1 | 1 | 1 | 0 |
| 6 | 1 | 1 | 0 | 1 | 0 |
| 7 | 0 | 0 | 0 | 1 | 0 |
| 8 | 1 | 0 | 0 | 1 | 1 |
| 9 | 0 | 1 | 0 | 1 | 1 |
| 10 | 1 | 1 | 1 | 1 | 1 |
| 11 | 0 | 0 | 1 | 1 | 1 |
| 12 | 1 | 0 | 1 | 0 | 1 |
| 13 | 0 | 1 | 1 | 0 | 1 |
| 14 | 1 | 1 | 0 | 0 | 1 |
| 15 | 0 | 0 | 0 | 0 | 1 |
FIG. 5

3,209,347
GRAY CODE GENERATOR

Alfred Cutaia, Rochester, Minn., assignor to International Business Machines Corporation, New York, N.Y., a corporation of New York Filed Sept. 20, 1962, Ser. No. 224,918
9 Claims. (Cl. 340—347)

This invention relates to apparatus for producing coded output signals in response to receiving a series of sequentially occurring electrical impulses and more particularly to such apparatus where there is never more than one variable change in response to each applied electrical impulse.

This type of apparatus is sometimes referred to as a commutator or Gray code generator and is particularly desirable for high speed automatic control applications because of the reduction of the chance for errors to occur since only one element of the apparatus undergoes a change in state at any one time.

However, apparatus of this type heretofore has been limited with regard to the drive load, the number of stages, fluctuation in the drive amplitude, and changes in position of the leading edge of the output impulse and the width thereof as related to the advance impulse. This invention utilizes electronic triggers or latches to indicate the states of the variables forming the code with a control element or control trigger for sequencing the changes in states of the triggers representing the variables. In this particular arrangement, the control trigger is utilized to determine the changes in state of the variables by the set and reset A.C. inputs of all of the variables while the D.C. inputs of the variables are interconnected so that only one of the variables changes state as the sequencing impulses are applied from the control trigger. Since the sequencing impulses are applied to all of the variables simultaneously, there is substantially no limit as to the number of variables. The gating technique is such that the load on the control trigger is nearly constant. Also, the gating technique is such that the output impulse of the generator is referenced to the leading edge of the impulse from the control element and has the same impulse width. This is very desirable because it eliminates the need for stretching or otherwise shaping the output impulse. The amplitude of the output signal from each variable is substantially constant.

Accordingly, one of the most important objects of the invention is to provide an improved apparatus for producing coded output signals in response to receiving a series of sequentially occurring electrical impulses where there is never more than one variable change in response to each applied electrical impulse.

Another very important object of the invention is to provide a coded impulse generator which is capable of providing an output signal having substantially a constant amplitude and pulse width irrespective of the number of variables forming the code.

Still a further object of the invention is to provide a coded impulse generator which provides an output impulse referenced to the leading edge of the advance impulse irrespective of the number of code variables.

Still another object of the invention is to provide a coded impulse generator which utilizes a control element for sequencing the changes in states of the variables forming the code by simultaneously applying sequencing impulses to the set and reset A.C. inputs of the elements representing the variables.

The foregoing and other objects, features and advantages of the invention will be apparent from the following more particular description of preferred embodiments of the invention, as illustrated in the accompanying drawings.

In the drawings:

FIG. 3 is a schematic circuit diagram of a preferred embodiment of the invention;

FIG. 4 is a circuit diagram of one of the stages of the embodiment shown in FIG. 3; and, FIG. 5 is a diagram illustrating the states of the control element and the elements representing the variables as successive impulses are applied to the control element.

Figure 1:
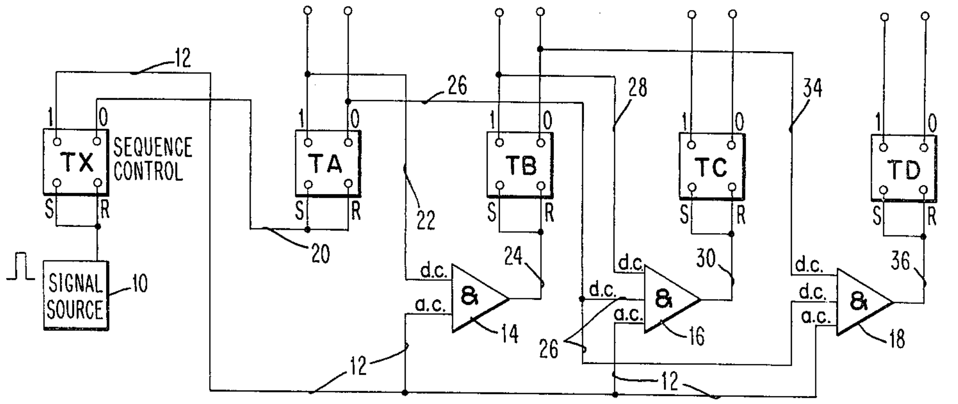
FIG. 1 is a schematic circuit diagram of one embodiment of the invention.
Figure 2:
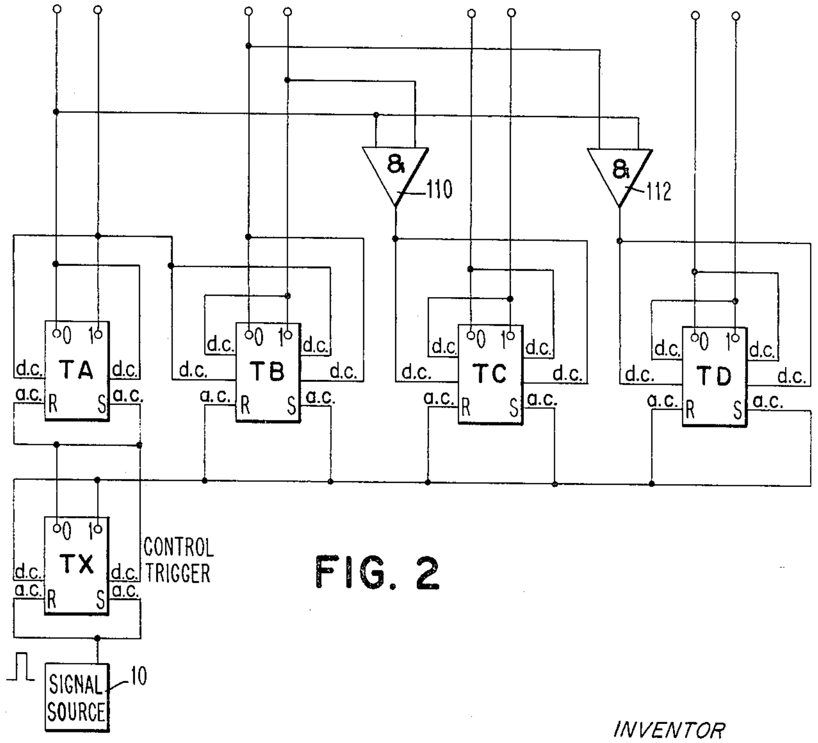
FIG. 2 is a schematic circuit diagram of another embodiment of the invention.

With reference to the drawings and particularly to FIGS. 1, 2 and 3, the invention is illustrated by way of example in three different embodiments. As it will be seen shortly, the different embodiments each involve the same principles and achieve the same results, but the apparatus varies. The various embodiments are illustrated with the use of electronic triggers; however, bistable elements such as latches are also suitable.

In FIG. 1, a signal source 10 has its output connected to the set and reset terminals of a sequence control trigger TX. The output associated with the set side of control trigger TX is connected by a conductor 12 to the A.C. inputs of logical AND circuits 14, 16 and 18. The output associated with the reset side of the control trigger TX is connected by a conductor 20 to the set and reset terminals of trigger TA which is utilized to represent one of the code variables of the code shown in FIG. 5. Hence it is seen that a change in the state of the control trigger TX is utilized to change the state of the triggers representing the code variables. The state of trigger TA switches whenever the state of the control trigger changes from the set to the reset state or from 1 to 0.

Logical AND circuit 14 has a D.C. input connected by a conductor 22 to the output associated with the set side of trigger TA. Hence, when trigger TA is set, logical AND circuit 14 is conditioned to pass an electrical impulse upon the control trigger TX changing from the reset state to the set state or from 0 to 1. The output of logical AND circuit 14 is connected by a conductor 24 to the set and reset terminals of a trigger TB. By this arrangement the state of trigger TB changes every time logical AND circuit 14 passes an electrical impulse. This of course occurs when trigger TA is in the set state and control trigger TX is changing from the 0 to the 1 state.

Logical AND circuit 16 has D.C. inputs connected by conductors 26 and 28 to the output associated with the reset side of trigger TA and to the output associated with the set side of trigger TB, respectively. Therefore, logical AND circuit 16 will pass an electrical impulse when trigger TA is in the reset state, trigger B is in the set state and the control trigger TX is switching from the reset or 0 state to the set or 1 state.

The output of logical AND circuit 16 is connected by a conductor 30 to the set and reset inputs of a trigger TC. The state of trigger TC will be changed whenever logical AND circurit 16 passes an electrical impulse. This occurs under the preceding conditions just described.

Logical AND circuit 18 has D.C. inputs connected by conductors 26 and 34 to output associated with the reset side of trigger TA and to the output associated with the reset side of trigger TB respectively. Accordingly, logical AND circuit 18 will pass an electrical impulse when trigger TA and TB are both in the reset state and control trigger TX is switching from the reset or 0 state to the set or 1 state.

The output of logical AND circuit 18 is connected by a conductor 36 to the set and reset terminals of trigger TD. The state of trigger TD will thus change whenever logical AND circuit 18 passes an electrical impulse.

As signals pass from signal source 10 to control trigger TX, the control trigger TX successively switches from the 1 state to the 0 state and from the 0 state to the 1 state as indicated in FIG. 5. Trigger TA switches from the 0 to the 1 state and from the 1 to the 0 state whenever control trigger TX switches from the 1 to the 0 state. Trigger TA remains in its previous state when control trigger TX switches from the 0 state to the 1 state.

Trigger TB switches state, i.e. from 1 to 0 or 0 to 1, only when trigger TA is in the 1 state and control trigger TX switches from the 0 to 1 state. At all other times, the trigger TB remains in its previous state.

Trigger TC switches state, i.e. from 1 to 0 or 0 to 1, only when trigger TA is in the 0 state, trigger TB is in the 1 state and control trigger TX switches from the 0 to the 1 state.

Trigger TD switches state, i.e. from 1 to 0 or 0 to 1, only when trigger TA is in the 0 state, trigger TB is in the 0 state and control trigger TX is switching from the 0 to 1 state.

By this arrangement only one of the triggers TA, TB, TC and TD changes state in response to a particular change in state of control trigger TX. The state of control trigger TX changes with each applied electrical impulse from signal source 10.

Trigger TX, TA, TB, TC and TD while shown schematically, are conventional type triggers well known in the art as are logical AND circuits 14, 16 and 18. Signal source 10 is any electrical signal source where the signals occur on the output thereof repetitively.

The embodiment shown in FIG. 2 has one less logical AND circuit than that in FIG. 1 because the triggers in this embodiment have the facility for performing certain of the logic functions. The triggers are of the type shown in FIG. 4 with the exception that each trigger has a maximum of two D.C. inputs, whereas the trigger in FIG. 4 has a maximum of three D.C. inputs. The trigger shown in FIG. 4 is utilized in the embodiment shown in FIG. 3 which does not include any external logical AND circuits; the triggers perform all of the logic functions. Generally speaking, FIG. 3 represents the preferred embodiment. In some circuits the components thereof are operated at voltage levels which do not permit three D.C. inputs with accurate distinction between the voltage level representing a zero and that representing a 1. Hence, in some instances, it may be necessary to utilize the embodiments shown in FIGS. 1 and 2.

In FIG. 2, the same reference character will be applied to the signal source and the triggers will be identified as in FIG. 1. The signal source 10 has its output connected to A.C. set and reset terminals of the trigger TX. The output of the set side for the trigger TX is connected to the D.C. input for the reset side of the trigger TX while the output associated with the reset side of the trigger TX is connected to the D.C. input of the set side of the trigger TX. The output associated with the reset side of the trigger TX is also connected to the A.C. inputs for the set and reset sides of trigger TA. The output associated with the set side of trigger TX is also connected to the A.C. inputs for the set and reset sides of triggers TB, TC and TD.

It is thus seen that in FIG. 2 the control trigger TX has its outputs connected to the A.C. inputs of triggers TA, TB, TC and TD, and therefore it controls the changes in states of these triggers. The changes in states of triggers TA, TB, TC and TD are conditioned by the outputs of these triggers. The output associated with the reset side of trigger TA is connected to the set side D.C. input of trigger TA and to inputs of logical AND circuits 110 and 112. The output associated with the set side of trigger TA is connected to the reset D.C. input of trigger TA and to the set and reset D.C. inputs of trigger TB. Logical AND circuits 110 and 112 have additional inputs from the set side output and reset side output of trigger TB, respectively. The set output of trigger TB is also connected to a D.C. reset input of trigger TB and the reset output of trigger TB is also connected to a set D.C. input of trigger TB.

The output of logical AND circuit 110 is connected to set and reset D.C. inputs of trigger TC and the output of logical AND circuit 112 is connected to the set and reset D.C. inputs of trigger TD. In addition, the set side of output trigger TC is connected to a reset D.C. input of trigger TC while the reset side output of trigger TC is fed to the set D.C. input of trigger TC. Similarly, the set side output of trigger TD is connected to a reset D.C. input and the reset side output of trigger TD is connected to a set D.C. input of trigger TD.

In order to appreciate these connections, assume that the trigger TX is in the set state. The next electrical impulse from the signal source 10 will cause the trigger TX to switch to the reset state. All of the triggers TA, TB, TC and TD are in the reset state, consequently trigger TA will be conditioned for switching to the set state as trigger TX switches from the set state to the reset state or from 1 to 0. Trigger TB will not be conditioned to switch states because the A.C. inputs thereof are connected to the set side output of trigger TX. Logical AND circuit 110 will not be in condition to pass an electrical signal and therefore the D.C. conditions for switching trigger TC are not present and, of course, the A.C. inputs of trigger TC are also connected to the set side output of control trigger TX. Similarly, trigger TD will not be switched because its A.C. inputs are connected to the set side output of control trigger TX. Hence, at this time, only trigger TA will switch states as control trigger TX switches from the set or 1 state to the reset or 0 state. With the trigger TA in the set state, the outputs of logical AND circuits 110 and 112 will be at a down level and triggers TC and TD will therefore not be conditioned for switching. However, the D.C. conditions for the set side of trigger TB are satisfied because trigger TA is in the set state and trigger TB is presently in the reset state. Hence, as trigger TX now switches from the reset to the set state or 0 to 1, the trigger TA remains in the set state and the trigger TB switches from the reset or 0 state to the set or 1 state. This is reflected in FIG. 5 at position number 2. On the next impulse, coming from signal source 10, control trigger TX switches from the set state to the reset state. Triggers TC and TD are still not in condition for being switched because of the conditions of logical AND circuits 110 and 112 and also the fact that the control trigger TX is switching from the 1 to the 0 state. Likewise trigger TB cannot be switched because the control trigger TX is switching from the 1 to the 0 state and the A.C. inputs of trigger TB are connected to the set side output control trigger TX. Accordingly at this time, only the state of trigger TA switches and it switches from the set to the reset state.

With the trigger TB in the set state and the trigger TA in the reset state, the inputs to logical AND circuit 110 are satisfied to provide an output level for conditioning the switching of trigger TC from the reset state to the set state. The condition of logical AND circuit 112 is such that the trigger TD will not be in condition to switch from the reset to the set state. Accordingly, as the control trigger TX switches from the 0 to 1 state, only trigger TC will switch and it will switch from the 0 to 1 state. The trigger TA cannot switch at this time because its A.C. inputs are connected to the reset or 0 output of trigger TX. The next impulse from signal source 10 causes control trigger TX to switch from the 1 to 0 state and consequently causes the trigger TA to switch from the 0 to 1 state. Triggers TB, TC and TD cannot be switched at this time because trigger TX is switching from the 1 to 0 state. As trigger TX switches again, it switches from the 0 to 1 state, trigger TA remains in the 1 state, trigger TB is switched to the reset state and trigger TC remains in the 1 state, while the state of trigger TD remains unchanged. The next impulse causes only trigger TA to change states and it switches from the 1 state to the 0 state. During the next impulse, trigger TA remains in the 0 state, trigger TB still remains in the 0 state, trigger TC remains in the 1 state and since the conditions of logical AND circuit 112 are now satisfied, so as to condition the D.C. set inputs of trigger TD, trigger TD switches to the 1 state as control trigger TX switches from the 0 to 1 state. As impulses continue to issue from signal source 10 to control trigger TX, changes in the states of the triggers TA, TB, TC and TD continue to take place according to FIG. 5.

The triggers TX, TA, TB, TC and TD in FIG. 3 are of the type shown in FIG. 4 except that for the triggers TX and TA there is only one D.C. input for the set and reset sides. The operation of the apparatus in FIG. 3 is quite similar to that of FIG. 2, with the exception that there are no external logical AND circuits. The reset output of trigger TX is connected to the A.C. reset and set inputs of trigger TA and the set output of trigger TX is connected to the reset and set A.C. inputs of triggers TB, TC and TD. Trigger TA is conditioned by its own outputs to change state whenever the trigger TX switches from the set or 1 state to the reset or 0 state. The trigger TB can be switched only when the trigger TA is in the set state and the trigger TX switches from the 0 to the 1 state. Trigger TC can be switched only when trigger TA is in the reset or 0 state, trigger TB is in the 1 or set state, and trigger TX is switching from the 0 to 1 state. This is because the D.C. inputs to trigger TC are connected to the reset output of trigger TA and the set output of trigger TB and the A.C. inputs are connected to the set output of trigger TX. Trigger TD can be switched only when trigger TA is in the 0 state, trigger TB is in the 0 state, and trigger TX is switching from the 0 to 1 state. The reason being that the D.C. inputs to trigger TD are connected to the 0 or reset outputs of triggers TA and TB, and the A.C. inputs are connected to the 1 or set output of trigger TX.

Trigger 200 in FIG. 4 is of the type which would operate satisfactorily for the embodiments disclosed in FIGS. 2 and 3. Trigger 200 includes transistors T1 and T2, each having an emitter base and collector. Transistors T1 and T2 are of the well-known PNP type transistors and have their emitters commonly connected to the ground. The collector of transistor T1 is connected through a resistor R11 to a minus voltage while the collector of transistor T2 is connected to the same minus voltage through a resistor R12. The trigger 200 can be reset through a D.C. reset terminal 201 which is connected to the base of transistor T1 through a diode D2. The A.C. input terminal 202 is connected to the base of transistor T1 through serially connected capacitor C1 and diode D1. The D.C. inputs to the base of transistor T1 are through resistors R1, R2 and R3 which are connected in parallel with each other and in series with the diode D1. The A.C. input terminal 203 is connected to the base of transistor T2 through a capacitor C2 and diode D3 connected in series. A conductor 204 connects the A.C. input terminal 202 to the A.C. input terminal 203. Transistor T2 has D.C. inputs connected to the base of the transistor through resistors R4, R5 and R6 which are connected in parallel with each other and in series with diode D3.

The inputs to the base of transistor T1 may be considered as inputs to the reset side of trigger 200, and the inputs to the base of transistor T2 may be considered as inputs to the set side of the trigger 200. The trigger 200 is reset by applying a positive input to terminal 201, thereby turning off transistor T1. When transistor T1 turns off, transistor T2 turns on because of resistors R8, R10 and R11. Resistor R11 satisfies the maximum load current for transistor T1 and resistors R8, R10 and R11 satisfy voltage divider requirement for the D.C. bias state of trigger T2. Similarly, resistor R12 satisfies the maximum load current for transistor T2 and resistors R12, R9 and R7 provide the necessary bias conditions for transistor T1. Capacitors C3 and C4 function as speed-up capacitors so that any change in state of the trigger 200 takes place more rapidly. The reset output is taken from the collector transistor T2 while the set output is taken from the collector transistor T1. The D.C. inputs to resistors R1 and R4 are connected to the set and reset outputs respectively.

Resistors R1, R2 and R3 are analog logical AND inputs to the reset side of the trigger. With positive inputs to resistors R1, R2 and R3, then a positive going signal or input into capacitor C1 will filter through diode D1 to cause the transistor T1 to turn off whereby transistor T2 turns on. Similarly with positive levels or inputs at resistors R4, R5 and R6, then a positive going signal into capacitor C2 will be passed by diode D3 to cause transistor T2 to turn off due to a positive rise in the potential at the base of transistor T2 and as transistor T2 turns off, the collector voltage of T2 drops to a minus potential, thereby causing the potential at the base of transistor T1 to drop due to a voltage divider action of resistors R12, R9 and R7, whereby transistor T1 will have an adequate negative potential at its base to turn on. With the transistor T1 on, the set output of the trigger 200 will be up or at the 1 state, and the input to resistor R1 will be up and assuming that the inputs to resistors R2 and R3 are up, then a positive going signal applied to the input terminal 202 will provide a positive rise at the base of transistor T1 causing the same to turn off. As transistor T1 turns off, the collector voltage of transistor T1 drops to the minus potential causing the potential at the base of transistor T2 to drop due to the voltage divider action of resistors R11, R10 and R8, whereby a negative potential is applied to the base of transistor T2 to turn the same on. With the transistor T2 on, the reset output of trigger 200 will be up. This, of course, conditions resistor R4 whereby with resistors R5 and R6 being conditioned, a subsequent positive going signal applied to the input terminal 203 will cause the trigger 200 to again switch states in the manner previously described.

If it is desired to provide outputs in a reverse order, this can be accomplished by starting the operation with the control element or trigger TX in the reset or 0 state. Then as the control trigger TX switches from 0 to 1, the trigger TD will switch from 0 to 1 because the gating conditions for switching trigger TD are satisfied. Trigger TA continues to switch only when trigger TX switches from 1 to 0. Likewise, trigger TB and TC switch according to the conditions described above for each embodiment.

From the above, it is seen that the invention provides an improved apparatus for producing coded output signals in response to receiving a series of sequentially occurring electrical impulses where there is never more than one variable change in response to each electrical impulse. Due to the arrangement described, it is seen that the invention provides a coded impulse generator which is capable of providing an output signal having a substantially constant amplitude irrespective of the number of variables forming the code. It is also seen that the invention provides a coded impulse generator which utilizes a control element for changing the sequences in states of the variables forming the code by simultaneously applying sequencing impulses to the set and reset inputs of the elements representing the variables.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A code generator for producing coded output signals with only one variable change in response to each applied electrical impulse comprising:

*n* bistable elements, one for each element of the code;

a bistable control element having an input connected to receive a series of electrical impulses whereupon receiving said impulses said control element undergoes changes in states;

a plurality of gating elements;

means connecting one output of said control element to an input of each gating element whereby all of the gating elements are simultaneously impulsed by said control element;

means connecting the other output of said control element to the input of a first bistable element of said $n$ bistable elements whereby said first bistable element switches state upon being impulsed by said control element; and means connecting the other $n$ bistable elements with said gating elements whereby said gating elements are conditioned to provide an electrical impulse to said other $n$ bistable elements to switch the states thereof in a manner that only one of said other $n$ bistable elements changes state in response to each signal applied to said gating elements from said control element.

2. A code generator for producing coded output signals with only one variable change in response to each applied electrical impulse comprising:

$n$ bistable elements, one for each element of the code, said bistable elements having at least one A.C. input and one D.C. input;

a bistable control element having an input for receiving a series of electrical impulses;

means for connecting one output of said control element to the A.C. input of the first bistable element of said $n$ bistable elements whereby said first bistable element is impulsed upon said control element switching from its set to its reset state;

means for connecting the other output of said control element to the A.C. inputs of the other $n$ bistable elements whereby the same will be impulsed simultaneously upon said control element changing from its reset to its set state; and means for interconnecting the D.C. inputs of said $n$ bistable elements with each other whereby the steady states of said $n$ bistable elements condition the same for switching so that only one of said $n$ bistable elements changes state in response to said control element changing state.

3. A code generator for producing coded output signals with only one variable change in response to each applied electrical impulse comprising:

$n$ bistable elements, one for each element of the code, said bistable elements having at least one A.C. input and one D.C. input;

a bistable control element having an input for receiving a series of electrical impulses and an output for each stable state;

means for connecting one output of said control element to the A.C. inputs of a first bistable element of said $n$ bistable elements so as to be impulsed upon said control element changing to one state;

means for connecting the other output of said control element to the A.C. inputs of the other bistable elements of said $n$ bistable elements whereby the same will be impulsed simultaneously upon said control element changing to the other state;

a set of external gating elements; and means for interconnecting the D.C. inputs of said $n$ bistable elements with each other and with said external gating elements whereby the steady states of said $n$ bistable elements condition said $n$ bistable elements together with the conditioning of said external gating elements so that only one of said $n$ bistable elements changes state in response to said control element changing state.

4. A code generator for producing coded output signals with only one variable change in response to each applied electrical impulse comprising:

$n$ bistable elements one for each element of the code each having a pair of A.C. inputs, the first and second bistable elements of said $n$ bistable elements having a pair and two pairs of D.C. inputs, respectively, the other bistable elements of said $n$ bistable elements each having three pairs of D.C. inputs;

a bistable control element having an input for receiving a series of sequentially occurring electrical impulses and one output connected to the pair of A.C. inputs of said first bistable element and another output connected to the pairs of A.C. inputs of said second and said other bistable elements; and means for interconnecting the pairs of said D.C. inputs of said $n$ bistable elements whereby the steady states of said $n$ bistable elements condition each other so that only one of said $n$ bistable elements changes state in response to said control element changing state.

5. A code generator for producing coded output signals with only one variable change in response to each applied electrical impulse comprising:

a signal source for providing a series of electrical impulses;

a sequence control trigger having its set and reset inputs connected to said signal source to receive electrical impulses therefrom;

first, second, third and fourth bistable elements, each representing an element of the code and each having set and reset inputs and outputs; and first, second and third logical AND circuits each having one input connected to the set output of said sequence control trigger, said first logical AND circuit having another input connected to the set output of said first bistable element, said second logical AND circuit having inputs connected to the reset and set outputs of said first and second bistable elements respectively, said third logical AND circuit having inputs connected to reset outputs of said first and second bistable elements respectively, the outputs of said first, second and third logical AND circuits being connected to the set and reset inputs of said second, third and fourth bistable elements respectively, the first bistable element having its set and reset inputs connected to the reset output of said sequence control trigger whereby said sequence control trigger switches state with each applied electrical impulse from said signal source, said first bistable element switches state only when said sequence control trigger is switching from the set to the reset state, said second bistable element switches state only when said first bistable element is in the set state and said sequence control trigger is switching from the reset to the set state, said third bistable element switches state only when said first bistable element is in the reset state, said second bistable element is in the set state and said sequence control trigger is switching from the reset to the set state, and said fourth bistable element only switches state when said first bistable element is in the reset state, said second bistable element is in the reset state and said sequence control trigger is switching from the reset to the set state.

6. A code generator for producing coded output signals with only one variable change in response to each applied electrical impulse comprising:

a signal source for providing a series of electrical impulses;

a sequence control trigger having a pair of A.C. inputs, a pair of D.C. inputs, with the A.C. inputs connected to said signal source and with a pair of outputs with one output being connected to one of the D.C. inputs of said pair of D.C. inputs and the other output being connected to the other D.C. input;

first, second, third and fourth bistable elements each representing an element of the code, the first bistable element having a pair of A.C. inputs and a pair of D.C. inputs, the second, third and fourth bistable elements each having a pair of A.C. inputs and two pairs of D.C. inputs;

means connecting said one output of said control trigger to the A.C. inputs of said first bistable element;

means connecting the other output of said control trigger to the A.C. inputs of said second, third and fourth bistable elements;

means connecting one output of said first bistable element to one D.C. input thereof and to one pair of D.C. inputs of said second bistable element;

means connecting the other output of said first bistable element to the other D.C. input thereof;

means connecting one output of said second bistable element to one D.C. input of the second pair of D.C. inputs to said second bistable element;

means connecting the other output of said second bistable element to the other D.C. input of said second pair of D.C. inputs to said second bistable element;

first and second logical AND circuits each having two inputs;

means connecting said other output of said first bistable element to one input of said first logical AND circuit;

means connecting said one output of said second bistable element to the other input of said first logical AND circuit;

means connecting said other output of said first bistable element to one input of said second logical AND circuit;

means connecting said other output of said second bistable element to the other input of said second logical AND circuit;

means connecting the output of said first logical AND circuit to a pair of D.C. inputs to said third bistable element;

means connecting one output of said third bistable element to one D.C. input of said second pair of D.C. inputs to said third bistable element;

means connecting the other output of said third bistable element to the other D.C. input of said second pair of D.C. inputs to said third bistable element;

means connecting one output of said fourth bistable element to one D.C. input of a first pair of D.C. inputs to said fourth bistable element;

means connecting the other output of said fourth bistable element to the other D.C. input of said first pair of D.C. inputs to said fourth bistable element; and means connecting the output of the second logical AND circuit to the second pair of D.C. inputs to said fourth bistable element whereby said first bistable element changes states upon said sequence control trigger changing from one state to the other state, said second bistable element changing state only when said first bistable element is in the one state and said sequence control trigger is changing from its other state to its one state, said third bistable element changes state only when said first bistable element is in its other state, said second bistable element is in its one state and said sequence control trigger is changing from its other state to its one state, and said fourth bistable element only switches state when said first bistable element is in its other state, said second bistable element is in its other state and said sequence control trigger is switching from its other state to its one state.

7. A code generator for producing coded output signals with only one variable change in response to each applied electrical impulse comprising:

a signal source for providing a series of electrical impulses;

a sequence control trigger having a pair of A.C. inputs connected to said signal source and a pair of D.C. inputs connected to first and second outputs of said sequence control trigger respectively; and first, second, third and fourth bistable elements each representing an element of the code, the first bistable element having a pair of A.C. inputs connected to said second output of said sequence control trigger and a pair of D.C. inputs connected to first and second outputs of said first bistable element respectively, said second bistable element having a pair of A.C. inputs connected to said first output of said sequence control trigger, a pair of D.C. inputs connected to said first output of said first bistable element and D.C. inputs connected to a first and second output of said second bistable element, said third bistable element having a pair of A.C. inputs connected to said first output of said sequence control trigger, a pair of D.C. inputs connected to the second output of said first bistable element, a pair of D.C. inputs connected to the first output of said second bistable element and D.C. inputs connected to first and second outputs of said third bistable element, said fourth bistable element having a pair of A.C. inputs connected to the first output of said sequence control trigger, a pair of D.C. inputs connected to the second output of said first bistable element, a pair of D.C. inputs connected to the second output of said second bistable element and D.C. inputs connected to first and second outputs of said fourth bistable element, whereby said first bistable element switches state when said sequence control trigger switches from its one to its zero state, said second bistable element switches state only when said first bistable element is in its one state and said sequence control trigger is switching from its zero to its one state, said third bistable element only switches state when said first bistable element is in its zero state, said second bistable element is in its one state and said sequence control trigger is switching from its zero to its one state, said fourth bistable element only switching state when said first bistable element is in its zero state, said second bistable element is in its zero state and said sequence control trigger is switching from its zero to its one state.

8. A code generator for producing coded output signals with only one variable change in response to each applied electrical impulse comprising:

a bistable control element having an input connected to receive a series of electrical impulses whereupon receiving said impulses said control element undergoes changes in states;

*n* bistable elements, one for each element of the code;

means connecting one output of said bistable control element to an input of the first bistable element of said *n* bistable elements so as to cause a change in state in said first bistable element upon switching of said bistable control element from its set state to its reset state;

means connecting the other output of said bistable control element to inputs of the other of said *n* bistable elements so as to cause switching of the states of said other bistable elements upon the same being conditioned for switching state; and means for conditioning said other bistable elements so that only one of said other *n* bistable elements changes state in response to said bistable control element switching from its reset to its set state.

9. A code generator for producing coded output signals with only one variable change in response to each applied electrical impulse comprising:

a bistable control element having an input connected to receive a series of electrical impulses;

*n* bistable elements, one for each element of the code;

means connecting one output of said bistable control element to the input of the first bistable element of said *n* bistable elements so as to cause a change in state of said first bistable element whenever said bistable control element switches from its set state to its reset state; and $n$—1 gating elements having outputs connected to inputs of said $n$ bistable elements except said first bistable element, the output of each gating element being connected to only one bistable element, and each gating element having one input connected to the other output of said bistable control element and at least one other input connected to one of the outputs of at least one of said $n$ bistable elements preceding the bistable element to which the output of the gating element is connected.

References Cited by the Examiner

UNITED STATES PATENTS 2,888,556 5/59 Richards ---------------- 235—92

MALCOLM A. MORRISON, *Primary Examiner.*